No. 733,103. PATENTED JULY 7, 1903.
C. W. WILLETT & G. F. STEEDMAN.
AUTOMATIC LUMBER TRIMMER.
APPLICATION FILED APR. 8, 1901.
NO MODEL. 3 SHEETS—SHEET 1.
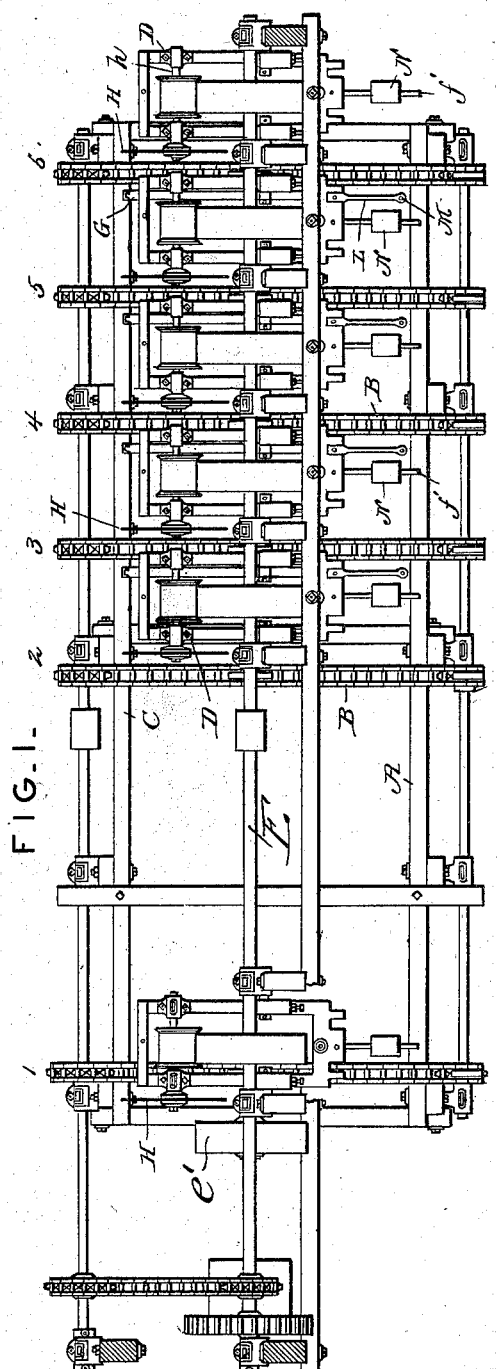
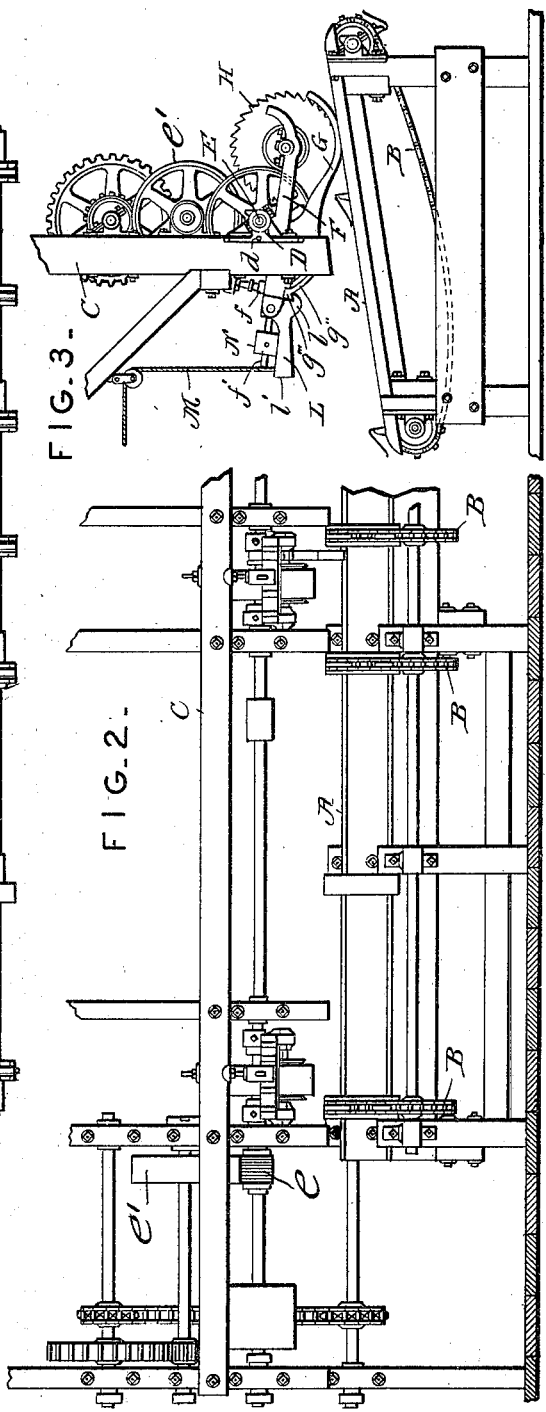
ATTEST-
Harry L. Ames.
INVENTORS.
Charles W. Willett
George F. Steedman.
By Bakewell & Cornwall Att'ys

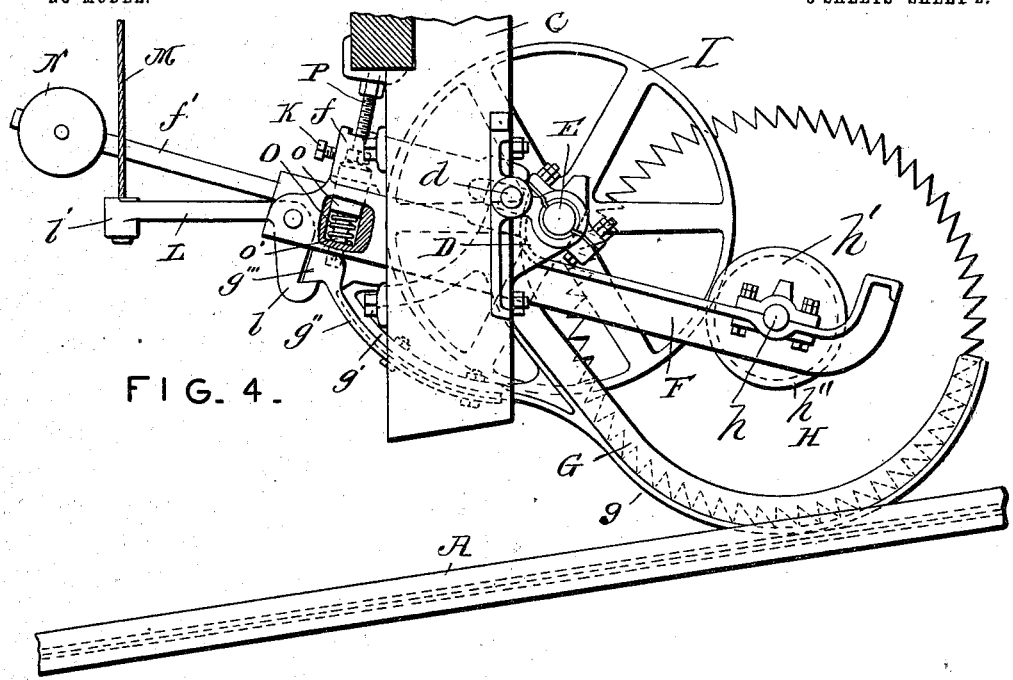

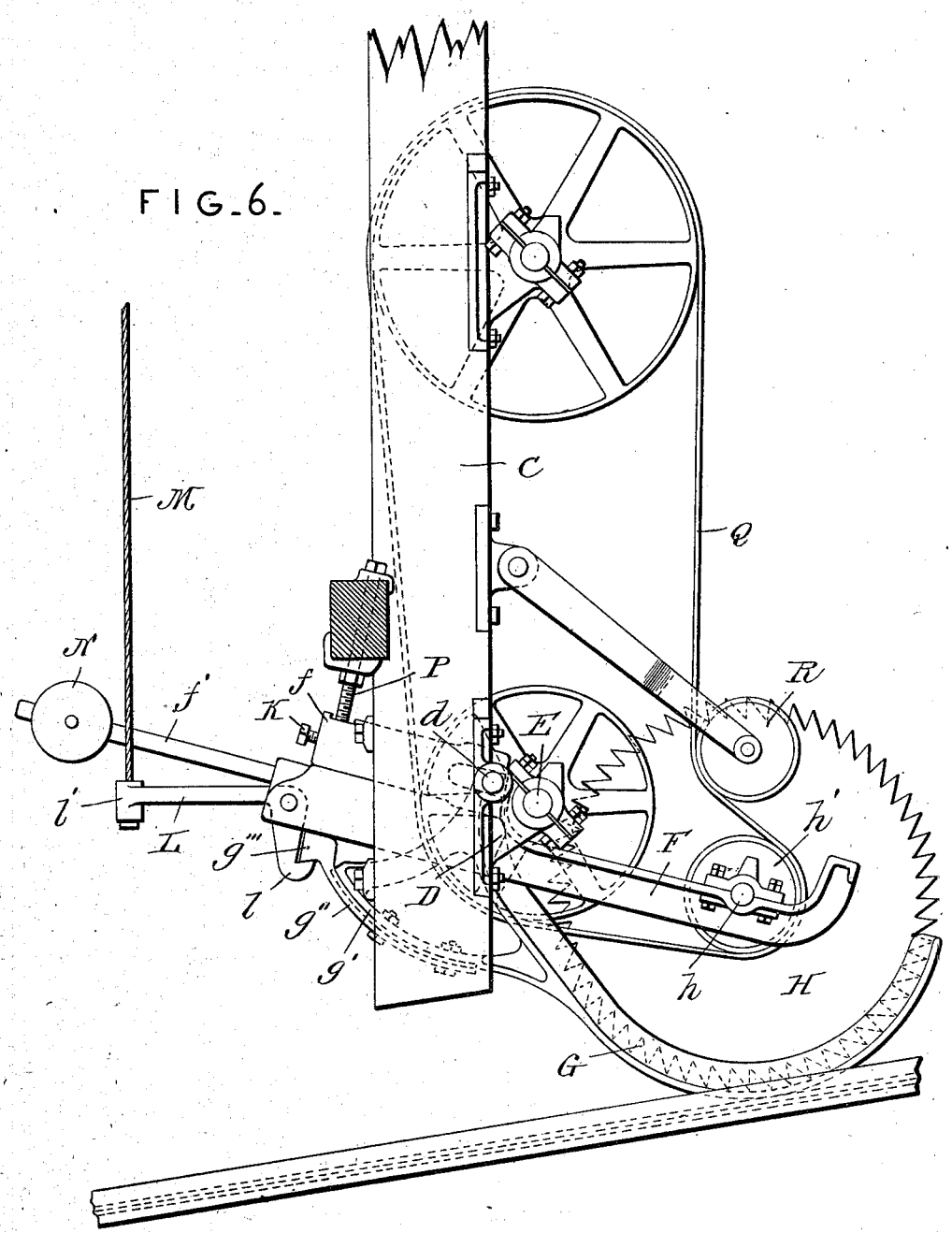

No. 733,103. Patented July 7, 1903.

UNITED STATES PATENT OFFICE.

CHARLES W. WILLETT AND GEORGE F. STEEDMAN, OF ST. LOUIS, MISSOURI.

AUTOMATIC LUMBER-TRIMMER.

SPECIFICATION forming part of Letters Patent No. 733,103, dated July 7, 1903.

Application filed April 8, 1901. Serial No. 54,870. (No model.)

*To all whom it may concern:*

Be it known that we, CHARLES W. WILLETT and GEORGE F. STEEDMAN, citizens of the United States, residing at the city of St. Louis, in the State of Missouri, have invented a certain new and useful Improvement in Automatic Lumber-Trimmers, of which the following is a full, clear, and exact description, such as will enable others skilled in the art to which it appertains to make and use the same, reference being had to the accompanying drawings, forming part of this specification, in which—

Figure 1 is a plan view of our improved automatic lumber-trimmer. Fig. 2 is a front elevational view of the same. Fig. 3 is an end elevational view of the same. Fig. 4 is an enlarged elevational view of a portion of the same. Fig. 5 is a plan view, partly in section, of the parts shown in Fig. 4; and Fig. 6 is an end elevational view showing a modified form of driving mechanism.

This invention relates to a new and useful improvement in automatic lumber-trimmers of that class wherein lumber is trimmed by having its ends cut off to uniform lengths by the employment of a plurality of saws mounted in independently-movable frames supported upon a suitable framework. A conveyer, preferably in the form of sprocket-chains carrying flights, is employed to carry the lumber to be trimmed to the saws, means being employed for automatically moving all of the saws intermediate the saws which trim the two ends of the lumber out of the path of travel of said lumber.

The prime object of this invention is to trim lumber to uniform lengths by the employment of a simple, strong, and practical device which is not liable to become out of order.

With these objects in view the invention consists in the construction, arrangement, and combination of the several parts, all as will hereinafter be described, and afterward pointed out in the claims.

In the drawings, wherein like characters designate like parts throughout the several views, A represents a suitable framework, preferably constructed of wood and upon which are arranged suitable conveyers in the form of chains B, carrying flights which pass over sprocket-wheels arranged on shafts journaled to said frame, said conveyer being driven by power imparted thereto in any suitable manner to cause it to travel in the proper direction to carry lumber to the saws, as is well understood.

C represents a framework, preferably formed of wood and suspended above the framework A and conveyer-chains B and on which framework C are mounted journal-boxes D, which support and journal a shaft E, saw-frames F, their carried saw-raising arms G, and associate parts.

Referring to Figs. 1, 2, and 3 of the drawings, it will be observed that power is supplied to the shaft E and the conveyer-chains B through suitable mechanism arranged at one end of the machine, the details of construction of which are deemed too obvious from the drawings to be here described other than to say that the conveyer before referred to is driven by friction, through the instrumentality of a preferably paper-covered pulley $e$, arranged on a suitable power-transmitting shaft, and a metallic pulley $e'$, arranged on another power-transmitting shaft.

For the sake of illustration we will number the saws and their supporting-frames in Fig. 1 of the drawings 1, 2, 3, 4, 5, and 6, the distance between saws 1 and 2 being preferably greater than the distance between saws 2 and 3 and the remaining saws. The purpose of arranging the saws and their supporting-frame 1 and 2 farther apart than are the saws 2 and 3, 3 and 4, 4 and 5, and 5 and 6 is that this distance is the minimum length desired for the lumber to be trimmed, while the maximum length of lumber to be trimmed by the machine illustrated is the distance between saws 1 and 6, the distance between saws 1 and 3, 1 and 4, and 1 and 5 being intermediate lengths, as is obvious. It will be further noted in this connection that the saws 1 and 6 and their frames are not provided with the saw-raising arm G, while all of the balance of the saws and their frames are thus equipped. This omission of the saw-raising arm G for the saw No. 1 is for the purpose of allowing this saw to always remain down, or in the path of travel of the lumber, in order that that end of the lumber will always be trimmed, the operator so adjusting the lumber on the conveyer as to have said saw cut off only a necessary amount of waste lumber, as will be understood. The omission of the saw-raising arm on saw No. 6 is for the reason that said saw No. 6 represents the "capacity" of the machine, if the expression can be permitted, and to raise said saw would prevent the trimming of that end of the longest piece of lumber the machine is designed to handle. With the exception of the omission of the saw-raising arm on saw-frames 1 and 6, the construction of all of the saws and their frames is identical, and we will therefore confine the following detailed description to but one of them.

Referring now to Figs. 4 and 5, it will be observed that the saw-carrying frame F is pivotally mounted upon pins or short shafts $d$, carried by the journal-boxes D. In one end of this saw-carrying frame, mounted in suitable bearings, is the saw-arbor $h$, carrying a friction drive-pulley $h'$. Upon one end of said arbor and preferably located outside of said frame is a saw H. I indicates a frictional drive-pulley, keyed or otherwise secured to the shaft E, which pulley I is caused to contact with the pulley $h'$ on the saw-arbor and drive the latter by means of its frictional contact therewith. Arranged on, preferably, the other end of the saw-carrying frame F to that upon which the saw H is mounted are housings $f$, preferably two in number, which housings are designed to receive and have slidably mounted therein boxes $d'$, mounted upon the shafts or pins $d$, said housings being provided with longitudinally-disposed slots for the passage and lateral movement of said pins $d$. The recesses formed in these housings in which the boxes are designed to play are preferably formed open at their inner ends and closed at their outer ends. Arranged in each of said recesses and interposed between a follower-block $j$, arranged adjacent said closed end and said boxes $d'$, is an expansible coiled spring J, whose function is to constantly exert pressure to force said frame F in the proper direction to cause its carried friction-pulley $h'$ to closely contact with the pulley I and produce a perfect frictional mesh.

K indicates an adjusting-screw which is arranged in the end wall of each of the housings $f$ and is designed to bear against the follower-block $j$ and when properly adjusted move the same in the proper direction to increase or decrease, as the case may be, the tension of the coiled spring J for regulating the degree of pressure desired of the pulleys $h'$ against the pulley I, as is obvious.

The saw-raising arm G, to which we have before referred, is preferably arranged on the other side of frame F to that upon which the saw is arranged, the same being pivotally mounted upon one of the same pins $d$ as is said frame F. This arm G is provided with what may be termed a "runner" portion $g$, which extends toward the saw H and when in its locked position to the frame F is concentric with and extends below said saw. This saw-raising arm G is also provided with a curved portion $g'$, in the form of an arc of a circle described from its point of pivotal support, said portion $g'$ being provided with an adjustable member $g''$, which is provided upon one end with a hook or tooth $g'''$ for coöperating with a latch $l$, formed on one member of a bell-crank lever L, pivotally mounted upon the frame F.

M indicates a cord or chain which is secured to the member $l'$ of the bell-crank lever L, which cord or chain is designed to be led by suitable pulleys to a point in convenient reach of the operator of the device and by which the latch $l$ can be manipulated to unlock the arm G from the frame F when it is undesirable to have that saw which it controls raised, as will be illustrated in the description of the operation of the device to follow.

From an inspection of the drawings it will be observed that the pivot-points of both the frame F and its carried parts and the raising-arm G and its carried parts are so arranged that the preponderance of weight is nearest the saw and under normal conditions will cause that end of them to remain in their lowermost positions. In order to regulate this preponderance of weight on the ends of the frame F and the arm G to a desired degree, we have arranged on that end of frame F farthest from the saw an arm $f'$, carrying an adjustable counterweight N. When lumber is passing under the arm G, the frame F and its carried saw has been raised, and consequently when the lumber passes beyond said arm G said frame will descend, and in order to cushion this drop of the frame we have arranged on that end of the frame F farthest from said saw an expansible coiled spring O, seated in a suitable recess and having a plunger $o$ resting thereupon, said plunger being preferably provided with a shank $o'$, which passes through said coiled spring O and through an opening formed in said frame F, said shank carrying a pin in its lower end for limiting its upward movement.

P indicates an adjustable stop secured in any convenient manner to, preferably, the framework C, said stop being in the path of the arc of movement of the plunger $o$, with which it coöperates in effecting the cushioning of the drop of the frame F.

It will be observed that the pivot-point of frame F, the center of shaft E, and the center of the saw-arbor are in line with each other when the saw is in its lowermost position, and it will also be noted that the distance between the center of pivot-point of frame F and the center of the saw-arbor is of greater length than the distance between the center of shaft E and said saw-arbor. This construction and arrangement of the parts is advantageous in this that when the three points just mentioned are in alinement the greatest tension is put on the springs J, which in turn produce a greater pressure of the pulley $h'$ against the pulley I, and consequently a more powerful driving friction at the time the saw is at work than is obtained when the saw and its frame are in an elevated position, and the centers of the pivot-points for said frame F, shaft E, and the saw-arbor are out of alinement. Furthermore, this increase of friction when the saw is at work or in its lowermost position and decrease of friction when the saw is elevated has another advantage than that recited in that should the saw when at work and when being driven by the greatest friction procurable by the mechanism employed strike some substance in the lumber too hard to be severed thereby the saw will be forced upwardly, and simultaneously therewith the friction driving the saw will be decreased and permit the saw to ride over that part of the lumber which it cannot cut and prevent mutilation of said saw.

The friction-pulley $h'$ is preferably formed of metal, having a circumferential flange $h''$ at each end, and between these flanges and surrounding that portion of the pulley intermediate said flanges are arranged rings of paper or like material for forming a frictional face, which is designed to contact with a pulley having a much harder surface—such, for instance, as iron. We prefer to turn in each of the flanges $h''$ of this pulley $h'$ a groove so shaped as to form a knife-edge on the outer edges of said flanges, the purpose of which is to prevent oil which exudes from the bearings of the saw-arbor and climbs or is thrown by centrifugal force outwardly upon the side faces of the pulley from coating the paper covering of said pulley $h'$, said oil being thrown off of the knife-edge of said flange tangentially by centrifugal force, as will be understood.

The operation of an automatic lumber-trimmer of this class being well known, we will describe but generally the operation of the same, except as to those features which we consider new in the art. In operation lumber to be trimmed is placed upon the conveyer, which conducts the same to the saws, the only particular care necessary in most instances on the part of the operator being to see that that end of the lumber to be trimmed by saw No. 1 is not so far away from said saw as to produce too much waste. This precaution being taken, the lumber under ordinary circumstances will be automatically taken care of—that is, trimmed to one of five different lengths, depending on its own length. For example, if a piece of lumber being fed to the saws is of a length greater than the distance between saws No. 1 and No. 2, but shorter than the distance between saw No. 1 and the raising-arm G of said saw No. 2, said lumber would be cut to the minimum length—i. e., a length equal to the distance between saws 1 and 2. If, on the other hand, the lumber to be sawed is of a greater length than the distance between saw No. 1 and the raising-arm G of saw No. 2, the runner portion $g$ of said arm G will be forced upwardly by the passage of the lumber thereunder, and through the instrumentality of the hook $g'''$ and the latch $l$ that portion of the saw-frame carrying the saw will be raised, and as the runner portion of the arm G extends some distance below the lower edge of the saw-teeth said lumber will be fed under and remain uncut by said saw No. 2. If the end nearest the saws 2 and 3 had extended sufficiently far to have been in the path of the latter saw, but not sufficiently far to have been in the path of the raising-arm G of said saw No. 3, the lumber would then have been trimmed or cut to a length equal to the distance between saws 1 and 3, as will be understood. Occasionally a piece of lumber is found having a very irregular end, a bad knot, or is otherwise imperfect, which, if left wholly to the machine, would not be satisfactorily operated upon. As, for instance, if a large knot were present in a piece of lumber a few inches inside of the saw which was about to trim its end nearest the automatic saws it is desirable to let down the next adjacent saw, which will cut off that portion of the lumber having said knot.

To accomplish the above, we have arranged on the pivoted raising-arm G the hook $g'''$, which coöperates with the latch formed on one member of the lever L, in turn pivotally mounted upon the frame F and which under normal conditions locks said arm and frame together and causes them to rise and fall in unison; but when the cord attached to the lever L is pulled the latch will release the hook $g'''$ and allow the frame F and arm G to have independent movement, which in reality means that the saw carried by said frame F will descend, and should a piece of lumber start to pass thereunder it will be severed thereby, while the arm G will simply ride idly over the lumber passing thereunder, rising as the lumber starts under it and falling after the lumber has passed therebeyond. This falling movement on the part of arm G will have the effect of locking the arm G to the frame F automatically, for the reason that the hook carried thereby will force the catch to one side until their engaging faces become locked, as will be understood from an inspection of Fig. 4 of the drawings.

In Fig. 6 we have shown a construction in which a belt Q is employed to drive the saw instead of a friction device, said belt passing under an idle tightening-pulley R, suspended at a suitable point from the framework C. In other respects the construction shown is similar to that illustrated in Fig. 4.

Having thus described our invention, what we claim, and desire to secure by Letters Patent, is—

1. In a mechanism of the character indicated, a movable saw-carrying frame, a movable raising-arm coöperating therewith, a latch upon one of said parts, and a member coöperating with said latch and adjustably connected to the other of said parts; substantially as described.

2. In a device of the character described, the combination with an overhanging support, of a frame pivotally mounted thereon, a saw carried by said frame, means for driving said saw, an arm pivotally mounted in juxtaposition to said frame, an adjustable member carried by said arm and provided with a tooth or shoulder, a bell-crank lever pivoted to said frame and having one of its members formed with a complementary tooth or shoulder for coöperating with the tooth of said adjustable member, and a buffer-spring and plunger carried by said frame for the purpose specified; substantially as described.

3. In a device of the character described, the combination with a pivotally-mounted saw-frame, of a saw-arbor carried thereby, a saw mounted on said arbor, a frictional pulley mounted on said arbor, and having circumferential flanges arranged on each end which project beyond the face of said pulley, said flanges being each provided with a circumferential groove of such shape as to form a knife-edge on the outermost edges of said flanges, a rotatable shaft journaled in some stationary support, and a pulley secured to said rotatable support and having its periphery in contact with the periphery of the pulley carried by said saw-arbor; substantially as described.

4. The combination with a support, of a saw-carrying frame pivotally supported thereon, a saw-arbor mounted upon said frame and provided with a pulley, and a driving-pulley adapted to engage and coöperate with said other pulley, said driving-pulley having its center intermediate the pivotal support for said frame and said arbor, whereby, when the frame is in operative position, said pulleys are in engagement and as said frame moves out of operative position, said pulleys tend to move out of engagement; substantially as described.

5. The combination with a support provided with a pivot, of a saw-carrying frame upon said pivot and longitudinally movable thereon, a saw-arbor upon said frame and provided with a pulley, a driving-pulley having its center intermediate said pivot and said other pulley, and a spring between said pivot and said frame, whereby when said frame is in position to present the saw in operative position, the said spring is under greatest tension and holds said pulleys in engagement, and as said frame moves from said position the tension upon said spring is relieved; substantially as described.

6. The combination with a pivotally-supported saw-carrying frame, of a saw-arbor mounted on said frame and carrying a pulley, a power-shaft mounted in advance of the pivotal support for the saw-carrying frame, said power-shaft carrying a pulley in line with the pulley on the saw-arbor, means for permitting the longitudinal movement of said saw-frame, and a spring between said frame and its pivot whereby, when said saw is in operative position, the axis of its arbor, the pivotal point of the saw-carrying frame, and the axis of rotation of the power-shaft, are in alinement; substantially as described.

7. The combination with a support provided with a pivot, and a power-shaft eccentric to said pivot, of a saw-carrying frame upon said pivot and longitudinally movable thereon, a saw-arbor, operative connection between said arbor and said shaft, and a spring between said pivot and said frame; substantially as described.

8. The combination with a support provided with pivots $d$, of a shaft E eccentric to said pivots and mounted in boxes arranged on said support, a pulley carried by said shaft, a saw-carrying frame provided with slotted boxes for receiving the pivots $d$, a saw mounted in said frame, and springs arranged in said boxes for coöperating with said pivots and said frame; substantially as described.

9. The combination with supports, of a shaft E carrying a pulley, pivots $d$ eccentric to said shaft, a saw-carrying frame provided with slots for receiving said pivots, whereby said saw-carrying frame is longitudinally movable, a saw mounted in said frame, and expansible springs bearing at one end against said pivots and at their other ends against the saw-carrying frame, for moving said frame longitudinally; substantially as described.

10. In an automatic lumber-trimmer of the character described, the combination with the table and its conveyer-chains, of the overhead supporting-framework, a saw-carrying frame pivotally mounted to said overhead supporting-framework, shaft E mounted in bearings on said overhead supporting-framework and eccentric to the pivotal point of said frame, a pivot $d$ arranged upon said bearings for said shaft E, guard-shoe G arranged on said pivot $d$, catch $g'''$ on said guard-shoe, a trigger L coöperating with said catch, means for operating said trigger, a frictional pulley on the saw-arbor in the rectangular swinging frame, a frictional pulley on shaft E, and a pair of spring-pressed members $d'$ arranged to keep the frictional pulleys in proper contact, substantially as described.

In testimony whereof the said CHARLES W. WILLETT, has affixed his signature, in the presence of two witnesses, this 30th day of March, 1901, and the said GEORGE F. STEEDMAN has affixed his signature, in the presence of two witnesses, this 23d day of March, 1901.

CHARLES W. WILLETT.
GEORGE F. STEEDMAN.

Witnesses as to the signature of Willett:
  HENRY O. WORDEN,
  CHAS. E. HARTMAN.
Witnesses as to the signature of Steedman:
  GEORGE BAKEWELL,
  GEO. E. HOFFMANN.